US009063735B2

(12) United States Patent
Ahn et al.

(10) Patent No.: US 9,063,735 B2
(45) Date of Patent: Jun. 23, 2015

(54) RECONFIGURABLE PROCESSOR AND METHOD FOR PROCESSING LOOP HAVING MEMORY DEPENDENCY

(75) Inventors: Hee-Jin Ahn, Seoul (KR); Dong-Hoon Yoo, Seoul (KR); Bernhard Egger, Seoul (KR); Min-Wook Ahn, Seoul (KR); Jin-Seok Lee, Seoul (KR); Tai-Song Jin, Seoul (KR); Won-Sub Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 13/272,846

(22) Filed: Oct. 13, 2011

(65) Prior Publication Data

US 2012/0096247 A1  Apr. 19, 2012

(30) Foreign Application Priority Data

Oct. 19, 2010  (KR) .................. 10-2010-0102058
Nov. 5, 2010  (KR) .................. 10-2010-0109998

(51) Int. Cl.
*G06F 9/38* (2006.01)
*G06F 9/32* (2006.01)

(52) U.S. Cl.
CPC .............. *G06F 9/325* (2013.01); *G06F 9/3838* (2013.01); *G06F 9/3897* (2013.01)

(58) Field of Classification Search
CPC . G06F 15/7867; G06F 15/8023; G06F 9/325; G06F 9/381; G06F 9/3836; G06F 9/3838
USPC ........................................... 712/15, 216, 241
See application file for complete search history.

(56) References Cited

U.S. PATENT DOCUMENTS

| 5,581,762 | A | | 12/1996 | Hayashi et al. |
| 5,920,724 | A | * | 7/1999 | Chang ............................. 717/161 |
| 5,974,538 | A | * | 10/1999 | Wilmot, II ..................... 712/218 |
| 6,031,987 | A | * | 2/2000 | Damani et al. .................. 703/17 |
| 6,341,262 | B1 | * | 1/2002 | Damani et al. .................. 703/16 |
| 6,460,173 | B1 | * | 10/2002 | Schreiber ........................ 716/104 |
| 6,615,340 | B1 | * | 9/2003 | Wilmot, II ..................... 712/209 |
| 6,671,878 | B1 | * | 12/2003 | Bliss .............................. 717/161 |
| 7,080,204 | B2 | | 7/2006 | Kim |
| 7,096,438 | B2 | * | 8/2006 | Sivaraman et al. ........... 716/108 |
| 7,210,127 | B1 | * | 4/2007 | Rangachari .................... 717/128 |
| 7,529,917 | B2 | * | 5/2009 | Ryu et al. ....................... 712/241 |
| 7,600,221 | B1 | * | 10/2009 | Rangachari .................... 717/128 |
| 8,019,982 | B2 | * | 9/2011 | Kim et al. ....................... 712/241 |

(Continued)

FOREIGN PATENT DOCUMENTS

| JP | 6-324881 A | 11/1994 |
| KR | 10-0498486 B1 | 7/2005 |

(Continued)

*Primary Examiner* — Jacob A Petranek
(74) *Attorney, Agent, or Firm* — NSIP Law

(57) ABSTRACT

Provided are a reconfigurable processor, which is capable of reducing the probability of an incorrect computation by analyzing the dependence between memory access instructions and allocating the memory access instructions between a plurality of processing elements (PEs) based on the results of the analysis, and a method of controlling the reconfigurable processor. The reconfigurable processor extracts an execution trace from simulation results, and analyzes the memory dependence between instructions included in different iterations based on parts of the execution trace of memory access instructions.

22 Claims, 4 Drawing Sheets

(56) References Cited

U.S. PATENT DOCUMENTS

| | | | |
|---|---|---|---|
| 8,140,883 B1* | 3/2012 | Lau | 713/502 |
| 8,423,343 B2* | 4/2013 | Wu et al. | 703/20 |
| 8,495,345 B2* | 7/2013 | Yoo et al. | 712/241 |
| 2002/0120923 A1* | 8/2002 | Granston et al. | 717/160 |
| 2003/0237080 A1* | 12/2003 | Thompson et al. | 717/161 |
| 2004/0268335 A1* | 12/2004 | Martin et al. | 717/161 |
| 2007/0094485 A1* | 4/2007 | Kim et al. | 712/241 |

FOREIGN PATENT DOCUMENTS

| | | |
|---|---|---|
| KR | 10-2009-0045744 A | 5/2009 |
| KR | 10-2009-0059337 A | 6/2009 |

* cited by examiner

RECONFIGURABLE PROCESSOR AND METHOD FOR PROCESSING LOOP HAVING MEMORY DEPENDENCY

CROSS-REFERENCE TO RELATED APPLICATION(S)

This application claims the benefit under 35 U.S.C. §119(a) of Korean Patent Application No. 10-2010-0102058 and No. 10-2010-0109998, filed on Oct. 19, 2010 and Nov. 5, 2010, respectively, in the Korean Intellectual Property Office, the entire disclosures of which are incorporated herein by reference for all purposes.

BACKGROUND

1. Field

The following description relates to a technique for accurate computation when allocating instructions between a plurality of processing elements (PEs) performing computation iterations in parallel.

2. Description of the Related Art

In general, processing by hardware may not be able to properly handle a task because of the inherent inflexibility of hardware designs. This is especially true when a particular task is subject to modification. Unlike processing by hardware, processing by software processing can provide flexibility for and adaptability to various tasks. However, the speed of processing by software is generally inferior to that of hardware.

Reconfigurable architectures are computer architectures whose hardware structures can be reconfigured to be optimized for a particular task. In addition, reconfigurable architectures can provide benefits of both hardware processing and software processing. As a result, there has been growing interest in reconfigurable architectures, especially in the field of digital signal processing.

Digital signal processing generally involves multiple loop computations. In order to speed up loop computations, loop level parallelism (LLP), such as software pipelining, is widely used.

Software pipelining is based on the principal that even operations belonging to different iterations can be processed in parallel so long as the operations do not have any dependency from other operations. In particular, software pipelining offers better performance when it is applied to reconfigurable arrays. For example, operations that can be processed in parallel may be allocated between a plurality of processing units of a reconfigurable array for parallel processing.

In recent years, the demand has steadily grown for research into ways to effectively allocate instructions between a plurality of processing elements (PEs) as performed in pipelining, and even execute loop instructions having a memory dependency properly.

SUMMARY

In one general aspect, there is provided a reconfigurable processor configured to process a loop computation including instructions. The reconfigurable processor includes an extractor configured to extract an execution trace of memory access instructions from results of simulating the loop computation; and a scheduler configured to analyze a memory dependence between instructions included in different iterations of the loop computation based on at least part of the execution trace.

The reconfigurable processor also may include a simulator configured to simulate the instructions of the loop computation applied to a test file.

The scheduler may generate an iteration window having a size that is equivalent to the time it takes to process instructions included in a single iteration of the loop computation and analyze instructions of iterations within the iteration window.

The scheduler also may calculate a minimum iteration interval (MII) between the different iterations of the loop computation based on the analyzed memory dependence between the instructions included in different iterations of the loop computation.

The reconfigurable processor also may include a plurality of processing elements where the scheduler is further configured to allocate the instructions of the loop computation between the plurality of processing elements based on the memory dependence between the instructions included in different iterations of the loop computation and to increase an iteration interval between the iterations of the loop computation from the calculated MII.

The execution trace may include at least one of register addresses, values stored at the register addresses, memory addresses, and values stored at the memory addresses.

The scheduler also may determine that instructions designating the same memory address have a memory dependence.

The scheduler also may allocate the instructions of the loop computation between the plurality of processing elements to process the instructions having a memory dependency in series.

The scheduler also may allocate the instructions of the loop computation between the plurality of processing elements to process the instructions without a memory dependency in parallel.

In another general aspect, there is provided a method of processing a loop computation including instructions. The method includes extracting an execution trace of memory access instructions from results of simulating the loop computations; and analyzing a memory dependence between instructions included in different iterations of the loop computation based on at least part of the execution trace.

The method also may include simulating the instructions of the loop computation applied to a test file.

Analyzing the memory dependence between the instructions may include generating an iteration window having a size that is equivalent to the time it takes to process instructions included in a single iteration of the loop computation and analyzing instructions of iterations within the iteration window.

The method also may include calculating a minimum iteration interval (MII) between the different iterations of the loop computation based on the analyzed memory dependence between the instructions included in different iterations of the loop computation.

The method also may include allocating the instructions of the loop computation between a plurality of processing elements of a reconfigurable processor based on the memory dependence between the instructions included in different iterations of the loop computation and to increase an iteration interval between the iterations of the loop computation from the calculated MII.

Extracting an execution trace of memory access instructions may include extracting an execution trace including at least one of register addresses, values stored at the register addresses, memory addresses, and values stored at the memory addresses.

In another general aspect, there is provided a reconfigurable processor configured to process a loop computation. The reconfigurable processor includes a reconfigurable array configured to be reconfigured according to a type of computation, including: a plurality of processing elements configured to execute instructions of the loop computation allocated thereto; a register file configured to transmit data between the processing elements and to store data for execution of the instructions of the loop computation; a memory; a simulator to simulate the instructions of the loop computation executed by the processing elements; an extractor configured to extract an execution trace of instructions that access the memory from results of the simulation of the instructions of the loop computation; and a scheduler configured to analyze a memory dependence between instructions included in different iterations of the loop computation based on at least part of the execution trace.

The simulator also may simulate the instructions of the loop computation by applying the instruction of the loop computation to a test file to generate the results.

The scheduler also may determine that instructions designating the same memory address have a memory dependence.

The scheduler also may reconfigure the reconfigurable array based on the memory dependence between the instructions.

The scheduler also may configure the reconfigurable array to process the instructions having a memory dependency in series.

The scheduler also may configure the reconfigurable array to process the instructions without a memory dependency in parallel.

The scheduler also may generate an iteration window having a size that is equivalent to the time it takes to process instructions included in a single iteration of the loop computation and analyze instructions of iterations within the iteration window.

The scheduler also may calculate a minimum iteration interval (MII) between the different iterations of the loop computation based on the analyzed memory dependence between the instructions included in different iterations of the loop computation.

The scheduler also may allocate the instructions of the loop computation between the plurality of processing elements based on the memory dependence between the instructions included in different iterations of the loop computation.

The execution trace may include at least one of register addresses, values stored at the register addresses, memory addresses, and values stored at the memory addresses.

Other features and aspects are apparent from the following detailed description, the drawings, and the claims.

BRIEF DESCRIPTION OF THE DRAWINGS

Throughout the drawings and the detailed description, unless otherwise described, the same drawing reference numerals refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
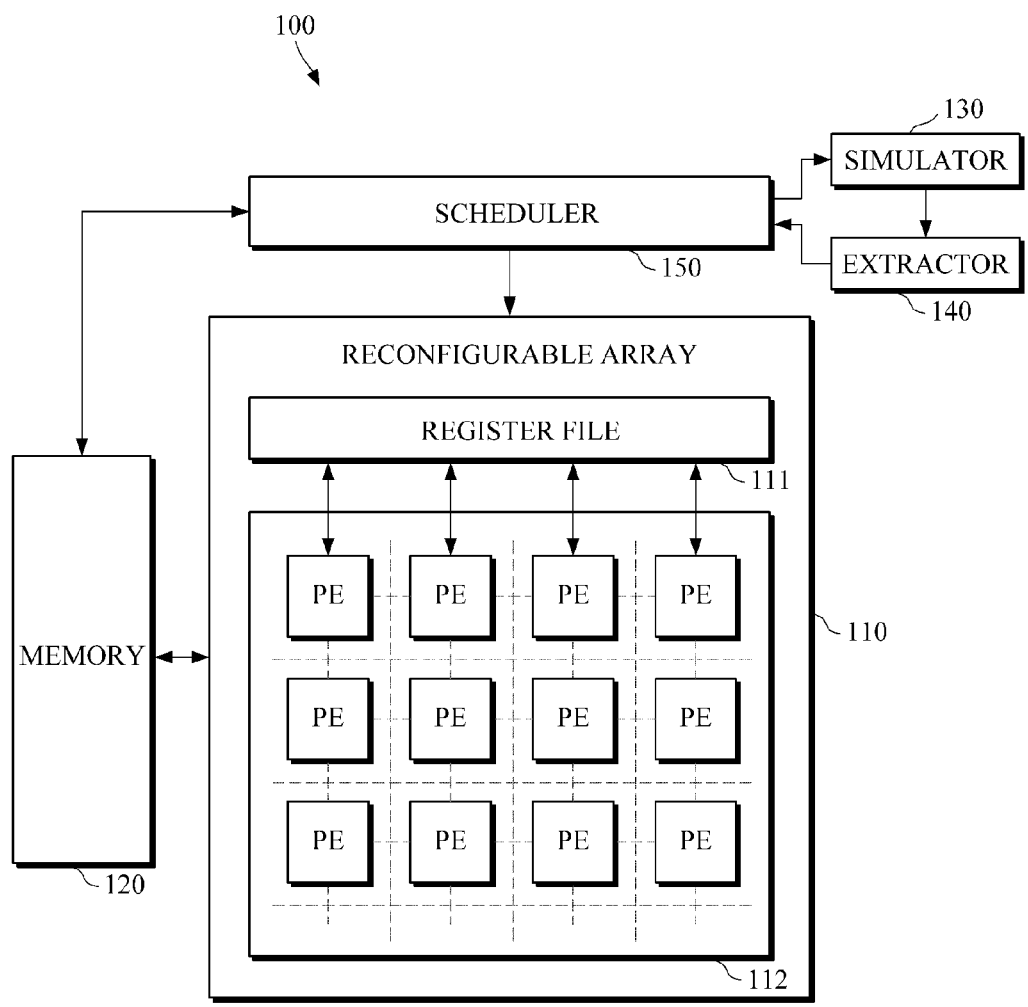
FIG. 1 is a diagram illustrating an example of a reconfigurable processor.

FIG. 1 illustrates an example of a reconfigurable processor. Referring to FIG. 1, a reconfigurable processor 100 includes a reconfigurable array 110, a memory 120, a simulator 130, an extractor 140, and a scheduler 150.

As used herein, the term 'iteration' indicates each execution of a loop computation. For example, when a loop is executed three times, the first, second, and third executions of the loop computation are referred to as the first, second, and third iterations of the loop computation. Instructions included in the same iteration may be mapped to different processing elements (PEs). Once mapped to different PEs, the instructions may be processed in parallel by the different PEs. As a result, the speed with which a computation comprising the instructions is made is improved.

The reconfigurable processor 100 may be driven in a coarse-grained array (CGA) mode or a very long instruction word (VLIW) mode. For example, the reconfigurable processor 100 may process loop computations in the CGA mode. In addition, the reconfigurable processor 100 may process loop computations and typical computations in the VLIW mode. Although the reconfigurable processor 100 may process loop computations in both the CGA mode and the VLIW mode, the efficiency of the processing of loop computations in the VLIW mode may be lower than the efficiency of the processing of loop computations in the CGA mode. In addition, the reconfigurable processor 100 may be driven alternately in the CGA mode and the VLIW mode during the execution of a particular program. In one example, the use traces obtained by VLIW-mode simulation are used as feedback for the real CGA compilation. For example, an application may be compiled in VLIW-only mode; simulation traces may be generated with numerous test inputs; and the application may then be recompiled in VLIW+CGA mode using memory dependence information in traces.

The reconfigurable array 110 includes a register file 111 and a plurality of PEs 112. The hardware structure of the reconfigurable array 110 can be reconfigured and be optimized for a particular task. For example, the hardware structure of the reconfigurable array 110 may be reconfigured appropriately by changing the connections between the PEs 112.

The register file 111 may transmit data between the PEs 112 or store various data necessary for the execution of instructions. Each of the PEs 112 may access the register file 111 and may write data to or read data from the register file 111. However, not all of the PEs 112 are connected directly to the register file 111. Therefore, some of the PEs 112 may access the register file 111 through other PEs 112 only.

Each of the PEs 112 may execute instructions allocated thereto. The connections between the PEs 112 and the order in which the PEs 112 execute the instructions may vary according to the type of task to be performed.

The memory 120 may store information about the connections between the PEs 112, information necessary for processing (e.g., instructions), and processing results. For example, the memory 120 may store data to be processed and the results of the processed data. Alternatively, the memory 120 may store information necessary for driving the reconfigurable processor 100, information on the connections between the PEs 112 in the reconfigurable array 110, and information on an operating method of the reconfigurable array 110.

The simulator 130 may simulate instructions to be executed by the PEs 112 by applying the instructions to a test file. For example, the simulator 130 may process a test file, such as an MP3 file or a video file using the instructions.

The extractor 140 performs profiling by extracting an execution trace from the results of the simulation performed by the simulator 130. The execution trace is a report on the results of the simulation of the instructions by the simulator 130. The report may specify the values of variables at the time of execution of each of the instructions. For example, the execution trace may include register addresses, the values stored at the register addresses, memory addresses, and the values stored at the memory addresses.

The scheduler 150 may analyze dependence between the instructions based on portions of the execution trace of memory access instructions. The scheduler 150 may determine that instructions designating the same memory address have a memory dependency. Instructions having a memory dependency should be processed in series to arrive at a correct result for a computation. The memory access instructions may be instructions to write data to or read data from the memory 120.

For example, assume that k-th and (k+1)-th iterations are as follows:
k-th iteration
A: ld_i r20<-M[0×50]
B: add r2<-r4+r5
C: st_i M[0x100]<-r8
D: sub r1<-r4−r5
E: st_i M[0x1000]<-r10; and
(k+1)-th iteration
A: ld_i r20<-M[0x100]
B: add r2<-r4+r5
C: st_i M[0x150]<-r8
D: sub r1<-r4−r5
E: st_i M[0x1000]<-r10
where ld indicates a load instruction, add indicates an addition instruction, st indicates a store instruction, sub indicates a subtraction instruction, r# indicates a register address, and M[ ] indicates a memory access.

It is relatively easy to determine whether instructions have a register dependency by comparing the names of the registers used by the instructions. Since memory dependency analysis involves a relatively complicated process of comparing memory address values (e.g., '0x100,' '0x150') stored in registers, memory dependency analysis is more difficult than register dependence analysis.

The execution trace may include register addresses r1, r2, r4, r5, r8, r10, and r20, values stored at the register addresses r1, r2, r4, r5, r8, r10, and r20, memory addresses accessed by memory access instructions included in the k-th and (k+1)-th iterations, and/or values stored at the memory addresses.

The scheduler 150 analyzes the dependence between the instructions based on parts of is the execution trace of the memory access instructions. For example, if two memory access instructions access the same memory address, the two memory access instructions may be determined to have a memory dependency. In the example given above, since instruction C of the k-th iteration and instruction A of the (k+1)-th iteration access the same memory address, i.e., '0100,' the scheduler 150 determines that instruction C of the k-th iteration and instruction A of the (k+1)-th iteration have a memory dependency. Alternatively, scheduler 150 may determine that instruction C of the k-th iteration and instruction A of the (k+1)-th iteration have a memory dependency based on the memory access M[0100] included in instruction C of the k-th iteration and the memory access M[0x100] included in instruction A of the (k+1)-th iteration, which indicates access of the same memory address, i.e., 0x100. The scheduler 150 may determine whether the instructions have a memory dependency based on the results of the simulation performed by the simulator 130. The operation of the scheduler 150 has been described with regard to the previous example of the analysis of the dependence between the k-th and (k+1)-th iterations; however, other dependencies may be determined. For example, the scheduler 150 may determine the memory dependence between the k-th iteration and a (k+2)-th iteration or between the k-th iteration and a (k+3)-th iteration, and so on.

An interval between execution a first iteration and a subsequent iteration is an iteration interval. The scheduler 150 may calculate a minimum iteration interval (MII) between iterations, for example, the k-th and (k+1)-th iterations, based on the determined memory dependence between the instructions. The MII is the minimum of resource MII and recurrence MII, where resource MII is determined by resource constraints and recurrence MII is by existing recurrences in a loop. The MII is a lower bound on the iteration interval.

In one example, the scheduler 150 may calculate the MII by the minimum of resource MII and recurrence MII. The iteration interval is determined from CGA scheduling. The CGA scheduler tries to schedule a loop from MII, and if it fails, it increments MII by 1 and tries again. This process is repeated until the scheduling succeeds or it reaches a scheduling limit (if any). More specifically, the scheduler 150 may allocate the instructions between the PEs 112 taking into consideration the memory dependence between the instructions while gradually increasing the iteration interval between, for example, the k-th and (k+1)-th iterations, from the calculated MII by one iteration at a time. However, this method is exemplary, and thus, the scheduler 150 may use various other methods to determine the iteration interval. For example, various methods of determining iteration intervals and calculating MIIs are described in U.S. Pat. No. 6,016,399 to Chang and U.S. Patent Publication No. 2003/0237080 to Thomson et al., both of which are incorporated herein by reference.

The scheduler 150 may generate an iteration window having a size equivalent to the time it takes to process instructions included in a single iteration. The scheduler 150 may analyze the dependence between the iterations using the iteration window. It is then possible to reduce the time it takes to analyze the dependence between instructions by skipping the analysis of instructions included in iterations that are not relevant to a current memory dependence analysis process.

Figure 2:
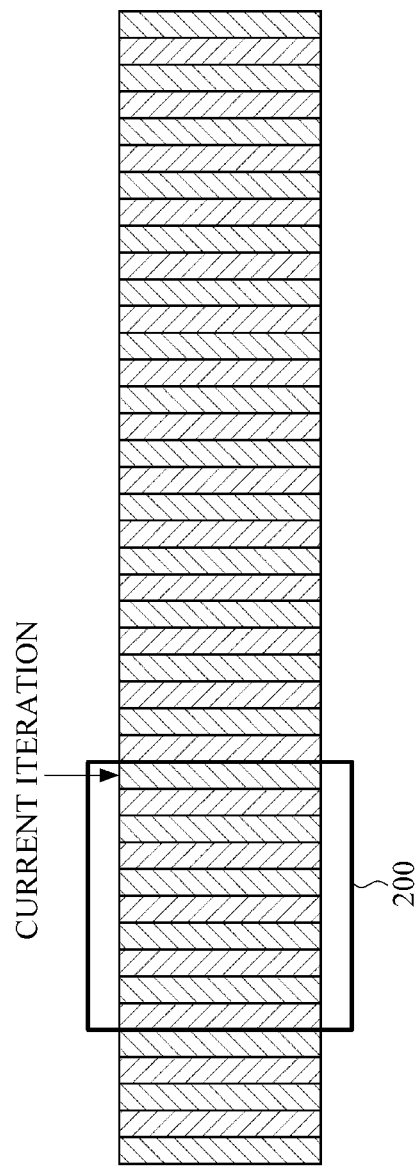
FIG. 2 is a diagram illustrating an example of an iteration window.

FIG. 2 illustrates an example of an iteration window. Referring to FIG. 2, assume that one iteration is input every cycle, and that it takes ten cycles to process instructions included in a single iteration.

Referring to FIGS. 1 and 2, the size of an iteration window 200 may be equal to or greater than the size corresponding to the time it takes to process instructions included in a single iteration. For example, since it takes ten cycles to process instructions included in a single iteration, the iteration window 200 may be created having a size that can accommodate ten or more iterations. The iterations are received from the iteration window in order to be analyzed. It takes ten cycles to receive ten iterations.

The scheduler 150 analyzes the dependence between instructions included in each of the iterations included in the iteration window 200. The scheduler 150 does not need to analyze the dependence between iterations more than a predefined instruction processing time apart from each other (in this example ten cycles) because the instructions separated by at least the predefined processing time are processed using serial processing and are not subject to parallel processing. That is, using this example, a first iteration and an eleventh iteration are not processed in parallel, rather one is processed after the other. Therefore, the size of the iteration window 200 may be set to be equal to or greater than the size corresponding to the time it takes to process the instructions included in a single iteration.

The scheduler 150 may analyze instructions to be executed in the reconfigurable array 110, and may allocate the instructions between the PEs 112 based on the results of the analysis.

The scheduler 150 may calculate an MII between iterations, and then the scheduler 150 may allocate the instructions in each of the iterations between the PEs 112 taking into consideration the dependence between the instructions while gradually increasing the iteration interval between the iterations by one iteration at a time from the calculated MII.

Figure 3:
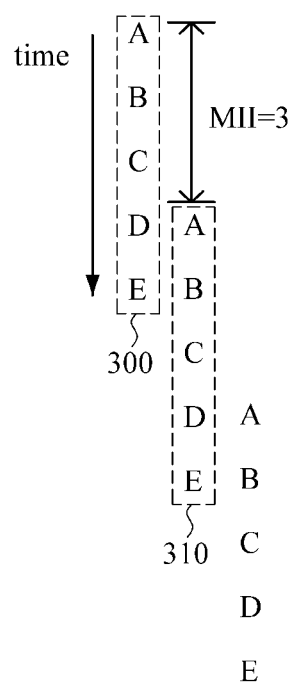
FIG. 3 is a diagram illustrating the concept of a minimum iteration interval (MII)

FIG. 3 further illustrates the MII. Referring to FIG. 3, the scheduler 150 may allocate instructions A, B, C, D, and E between the PEs 112 taking into consideration the dependence between instructions A, B, C, D, and E while gradually increasing an iteration interval between first and second iterations 300 and 310 one iteration at a time from an MII.

Referring to FIG. 3, the scheduler 150 also may allocate instructions A, B, C, D, and E between the PEs 112 taking into consideration the dependence between instructions A, B, C, D, and E while gradually increasing the iteration interval between the first and second iterations 300 and 310 one at a time from an MII of 3. For example, if instruction D of the first iteration 300 and instruction B of the second iteration 310 have a memory dependency, the scheduler 150 may set a minimum iteration interval between the first and second iterations 300 and 310 to 3, such that instruction B of the second iteration 310 is executed after the execution of instruction D of the first iteration 300. Then, the scheduler 150 may allocate instructions A, B, C, D, and E between the PEs 112 taking into consideration the dependence between instructions A, B, C, D, and E while gradually increasing the iteration interval between the first and second iterations 300 and 310 from the set MII value of 3.

Figure 4:
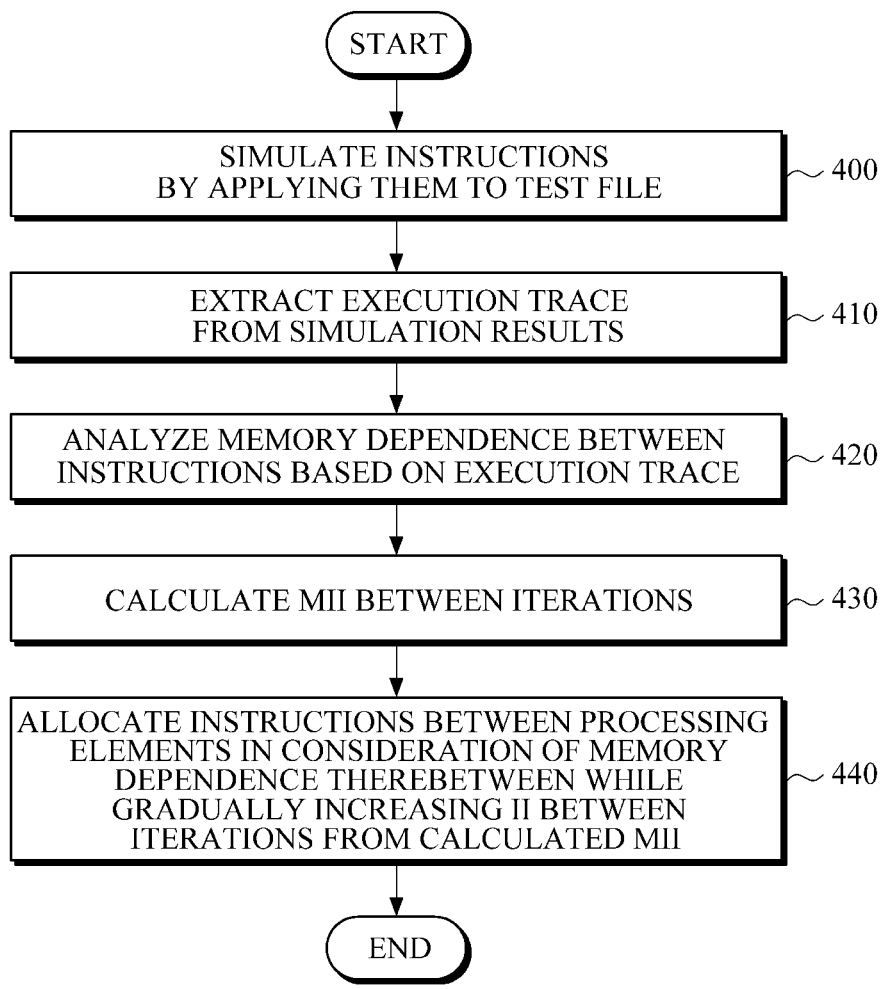
FIG. 4 is a flowchart illustrating an example of a method of controlling a reconfigurable processor.

FIG. 4 is a flowchart of an example of a method of controlling a reconfigurable processor. Referring to FIG. 4, instructions to be executed by a plurality of PEs are simulated by applying the instructions to a test file (400). An execution trace is extracted from the results of the simulation performed in operation 400 (410). The memory dependence between the instructions is analyzed based on parts of the execution trace of memory access instructions (420). For example, an iteration window whose size is equivalent to the time it takes to process instructions included in a single iteration may be generated, and the memory dependence between instructions in different iterations within the iteration window may be analyzed. An MII between the different iterations is calculated based on the results of the analysis performed in operation 420 (430). The instructions are allocated between the PEs taking into consideration the results of the analysis performed in operation 420 while gradually increasing the iteration interval between the different iterations from the calculated MII (440).

According to the method shown in FIG. 4, it is possible to improve the precision of computation by allocating iterations between a plurality of PEs taking into consideration the dependence between memory access instructions.

In addition, it is possible to reduce the time required to perform memory dependence analysis by analyzing the dependence between memory access instructions using an iteration window whose size is equivalent to the time necessary to process a single iteration.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. Some of the described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor configured to process a loop computation including instructions, the reconfigurable processor comprising:
   an extractor configured to extract an execution trace of memory access instructions from results of simulating the loop computation; and
   a scheduler configured to analyze a memory dependence between instructions included in different iterations of the loop computation based on at least part of the execution trace, to calculate a minimum iteration interval (MII) between the different iterations of the loop computation based on the analyzed memory dependence between the instructions included in different iterations of the loop computation, and to increase an iteration interval between the iterations of the loop computation from the calculated MII.

2. The reconfigurable processor of claim 1, further comprising a simulator configured to simulate the instructions of the loop computation applied to a test file.

3. The reconfigurable processor of claim 1, wherein the scheduler is further configured to generate an iteration window having a size that is equivalent to the time it takes to process instructions included in a single iteration of the loop computation and to analyze instructions of iterations within the iteration window.

4. The reconfigurable processor of claim 1, further comprising a plurality of processing elements wherein the scheduler is further configured to allocate the instructions of the loop computation between the plurality of processing elements based on the memory dependence between the instructions included in different iterations of the loop computation.

5. The reconfigurable processor of claim 1, wherein the execution trace includes at least one of register addresses, values stored at the register addresses, memory addresses, and values stored at the memory addresses.

6. The reconfigurable processor of claim 1, wherein the scheduler is further configured to determine that instructions designating the same memory address have a memory dependence.

7. The reconfigurable processor of claim 4, wherein the scheduler is further configured to allocate the instructions of the loop computation between the plurality of processing elements to process the instructions having a memory dependency in series.

8. The reconfigurable processor of claim 4, wherein the scheduler is further configured to allocate the instructions of the loop computation between the plurality of processing elements to process the instructions without a memory dependency in parallel.

9. A method of processing a loop computation including instructions, the method comprising:
   extracting an execution trace of memory access instructions from results of simulating the loop computations;
   analyzing a memory dependence between instructions included in different iterations of the loop computation based on at least part of the execution trace;
   calculating a minimum iteration interval (MII) between the different iterations of the loop computation based on the analyzed memory dependence between the instructions included in different iterations of the loop computation; and
   increasing an iteration interval between the iterations of the loop computation from the calculated MII.

10. The method of claim 9, further comprising simulating the instructions of the loop computation applied to a test file.

11. The method of claim 9, wherein analyzing the memory dependence between the instructions comprises generating an iteration window having a size that is equivalent to the time it takes to process instructions included in a single iteration of the loop computation and analyzing instructions of iterations within the iteration window.

12. The method of claim 9, further comprising allocating the instructions of the loop computation between a plurality of processing elements of a reconfigurable processor based on the memory dependence between the instructions included in different iterations of the loop computation.

13. The method of claim 9, wherein extracting an execution trace of memory access instructions includes extracting an execution trace including at least one of register addresses, values stored at the register addresses, memory addresses, and values stored at the memory addresses.

14. A reconfigurable processor configured to process a loop computation comprising:
   a reconfigurable array configured to be reconfigured according to a type of computation, including:
      a plurality of processing elements configured to execute instructions of the loop computation allocated thereto;
      a register file configured to transmit data between the processing elements and to store data for execution of the instructions of the loop computation;
   a memory;
   a simulator configured to simulate the instructions of the loop computation executed by the processing elements;
   an extractor configured to extract an execution trace of instructions that access the memory from results of the simulation of the instructions of the loop computation; and
   a scheduler configured to analyze a memory dependence between instructions included in different iterations of the loop computation based on at least part of the execution trace, to calculate a minimum iteration interval (MII) between the different iterations of the loop computation based on the analyzed memory dependence between the instructions included in different iterations of the loop computation, and to increase an iteration interval between the iterations of the loop computation from the calculated MII.

15. The reconfigurable processor of claim 14, wherein the simulator is configured to simulate the instructions of the loop computation by applying the instruction of the loop computation to a test file to generate the results.

16. The reconfigurable processor of claim 14, wherein the scheduler is further configured to determine that instructions designating the same memory address have a memory dependence.

17. The reconfigurable processor of claim 14, wherein the scheduler is further configured to reconfigure the reconfigurable array based on the memory dependence between the instructions.

18. The reconfigurable processor of claim 14, wherein the scheduler is further configured to configure the reconfigurable array to process the instructions having a memory dependency in series.

19. The reconfigurable processor of claim 14, wherein the scheduler is further configured to configure the reconfigurable array to process the instructions without a memory dependency in parallel.

20. The reconfigurable processor of claim 14, wherein the scheduler is further configured to generate an iteration window having a size that is equivalent to the time it takes to process instructions included in a single iteration of the loop computation and to analyze instructions of iterations within the iteration window.

21. The reconfigurable processor of claim 14, wherein the scheduler is further configured to allocate the instructions of the loop computation between the plurality of processing elements based on the memory dependence between the instructions included in different iterations of the loop computation.

22. The reconfigurable processor of claim 14, wherein the execution trace includes at least one of register addresses, values stored at the register addresses, memory addresses, and values stored at the memory addresses.

* * * * *